United States Patent [19]

Heimke

[11] 4,030,699

[45] June 21, 1977

[54] HANDLING DEVICE FOR SHIFTING HEAVY LOADS ALONG A SLIDING TRACK

[75] Inventor: Wolfram Heimke, Chemin les Goules Antibes, France

[73] Assignee: Union Industrielle et D'Entreprise, Paris, France

[22] Filed: Jan. 5, 1976

[21] Appl. No.: 646,612

[30] Foreign Application Priority Data

May 2, 1975  France ............................. 75.13814

[52] U.S. Cl. ................................ 254/108; 214/1 H
[51] Int. Cl.$^2$ ........................................ B65G 7/00
[58] Field of Search ................ 214/1 R, 1 BB, 1 H, 214/1 P; 254/105, 108; 104/154, 273

[56] References Cited

UNITED STATES PATENTS

| | | | |
|---|---|---|---|
| 2,696,313 | 12/1954 | Gudikunst | 254/105 X |
| 3,031,167 | 4/1962 | Roussel | 254/105 |
| 3,567,044 | 3/1971 | Travis | 214/1 P |

*Primary Examiner*—Frank E. Werner
*Attorney, Agent, or Firm*—Burgess, Ryan and Wayne

[57] ABSTRACT

A device for slidingly displacing or shifting a heavy load along a sliding comprises a platform provided with double-acting hydraulic jacks and resting on a guide rail. The platform is provided with hooks movable in a vertical direction and adapted to penetrate, when in their lowered position, apertures provided in the rail. Each hook has an oblique surface at the front end of the hook, which surface forms a sliding ramp adapted to slide on the front edge of an aperture wherein the hook is engaged. Each hook further has a locking surface at its rear end, which is adapted to cooperate with the rear edge of said aperture. The distance between any two adjacent ones of the apertures provided in the rail is at least substantially equal to the stroke length of the jacks, whereby the actuation of the jacks allows the load to be displaced by incremental movements.

5 Claims, 8 Drawing Figures

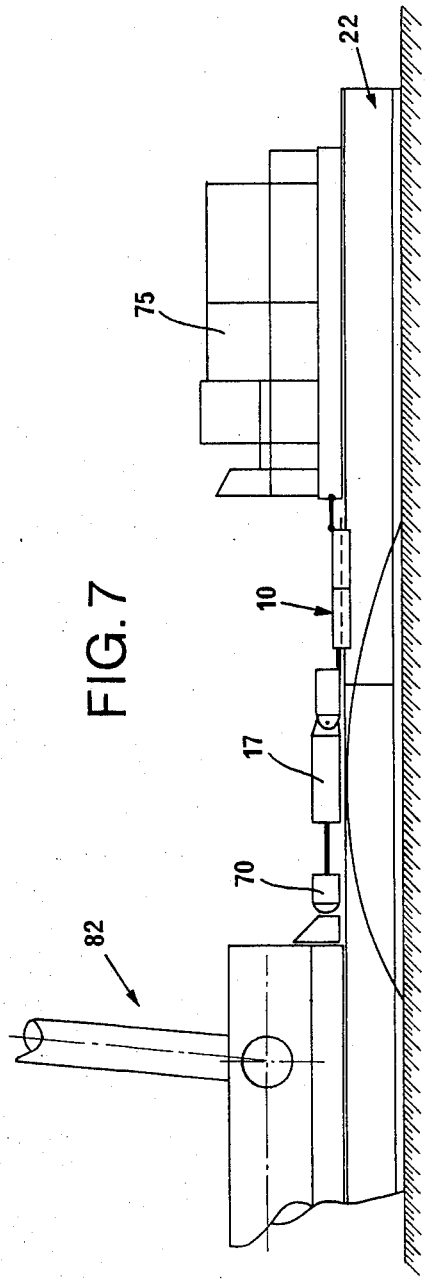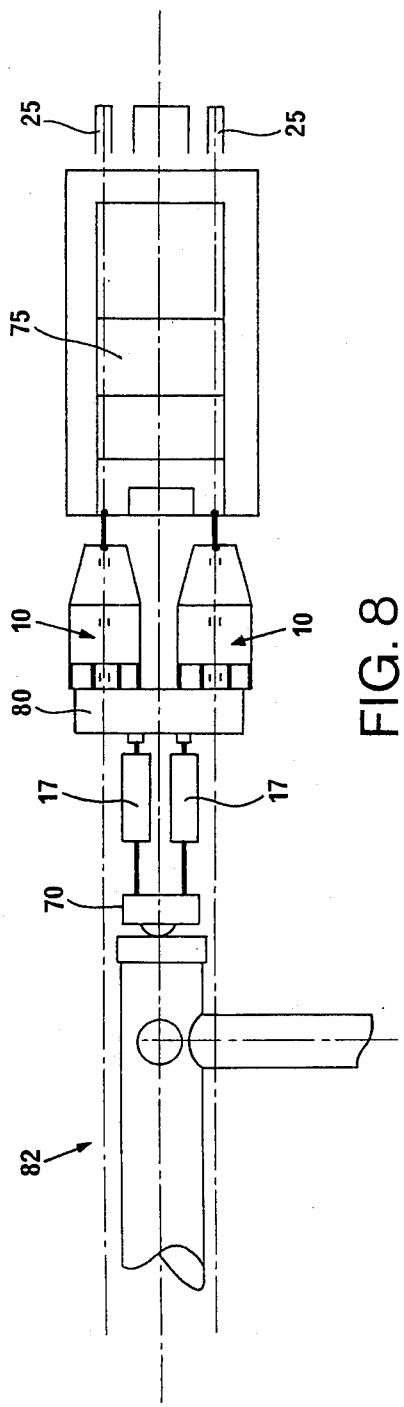

HANDLING DEVICE FOR SHIFTING HEAVY LOADS ALONG A SLIDING TRACK

The present invention is related to a handling device for shifting or slidingly displacing heavy loads along a sliding track.

It is known that in many cases very heavy loads are slidingly displaced on sliding tracks on which the load to be displaced is supported, said tracks being arranged between a starting station and a receiving or unloading station, and associated to e.g. hydraulic devices adapted to displace the loads by successive incremental motions defining each a comparatively small travelling length.

Techniques of this kind are applied particularly for loading and unloading ships; they are also applied in the field of the ship building when it is desired to displace pre-assembled ship sections toward the location where they are to be assembled to constitute the finished ship and where the ship is to be launched; such techniques are also applied in the fields of house building and of public works, especially for transferring elements of nuclear installations or for displacing bridge elements, for transporting pipe-line sections, elements for drilling sub-marine wells, etc..

It is known to use, when applying such technique, a device comprising at least one movable platform provided with double-acting hydraulic jacks the respective piston-rod ends of which are connected to the load to be displaced, said platform being supported, through the intermediary of supporting means, on a guiding rail associated to the above mentioned track, while locking means for locking said platform on said rail are provided.

This kind of device is operated in the following manner:
 the platform is locked, in a given position on the track, while the hydraulic jacks are in the retracted position;
 the hydraulic jacks are then extended, thus causing the displacement of the load over a distance corresponding to the stroke length of the jacks;
 the platform is released with respect to the track;
 the hydraulic jacks are retracted an thus cause the platform to be displaced over a distance corresponding to the stroke length of the jacks;
 the above described steps are repeated, if necessary, until the result to be obtained is achieved, (i.e. until the load has been displaced over the desired distance).

The known device is comparatively complex, and the locking of the platform is achieved in said device by hydraulically clamping certain elements of the track which are constituted by I-shaped sections adapted to be gripped between jaws associated to the platform.

The instant invention is aimed at providing a device for displacing heavy loads by a sliding motion, in a manner similar to that described herein above.

It is an object of the invention to provide a device of this kind which presents a structure more simple than that of the known devices, and which operates in a more reliable manner.

Another object of the invention is to provide a device of the kind described herein above, wherein the locking means comprise at least one catching or hooking element movable in a substantially vertical direction with respect to the platform between a lowered position wherein said catching element projects from the lower surface of said supporting means and a raised position wherein said catching means does substantially not project from the lower surface of said supporting means, said rail being provided with a plurality of apertures equally spaced from each other in the longitudinal direction of said rail and adapted be receive the projecting portion of said catching means when the latter is in said lowered position, said projecting portion having at its front end, with reference to the direction of displacement of said load, an oblique surface forming a sliding ramp adapted to cooperate with the front edge of any one of said apertures, and said projecting portion having at its rear portion a locking surface adapted to engage the rear edge of the aperture concerned.

In a preferred embodiment of the invention said locking surface is essentially constituted by the bottom wall of a slot provided in the rear portion of said projecting portion of the catching element.

Thus when the platform is pushed in the forward direction, the catching element or hooking element is raised so as not to impede the displacment of the platform; on the contrary, when it is tried to push the platform in the opposite, i.e. rearward, direction, the platform is locked as the rear edge of the aperture penetrates the slot and engages the bottom wall thereof. This locking effect is particularly efficient and reliable.

The invention will be described in a more detailed manner herein below with reference to the appended drawings which are given by way of illustration, but not of limitation.

Figure 6:
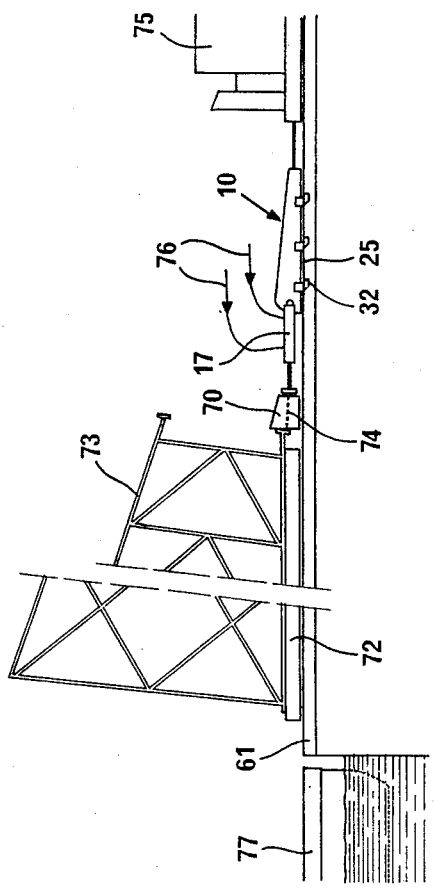

FIG. 6 schematically shows the operation of the device according to the invention for shifting a derrick element onto a barge.

FIGS. 7 and 8 show, respectively in side view and in partial plan view, another application of the device according to the invention, for displacing pipe-line elements.

Figure 1:
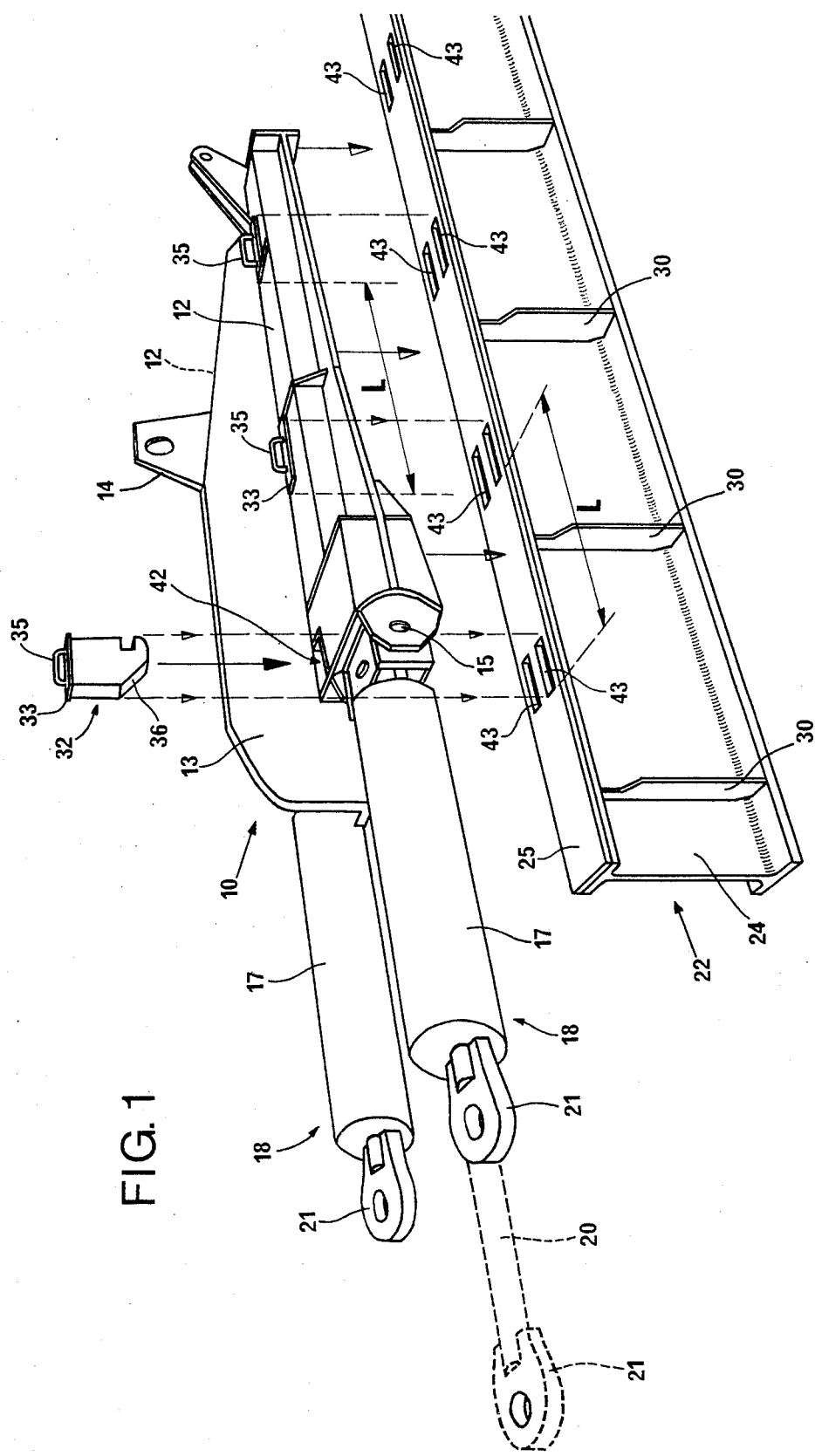
FIG. 1 is a perspective view of one embodiment of the invention, comprising hydraulic jacks associated with a platform which constitutes the essential feature of the device according to the invention, said Figure also showing the guiding rail associated with said platform, said two members being however shown separated from each other.

In the embodiment shown in the drawings and described herein below, the device according to the invention comprises a platform 10 constituted by folded and welded metal sheet elements including in particular two longitudinal box sections 12 arranged respectively at the opposed sides of a longitudinal wall 13 which, in FIG. 1, masks one of the box-sections. The wall 13 is provided with a lug 14 for handling. At the front end of platform 10, the latter is provided with a pin 15 which, in normal operating conditions, is substantially horizontal and to which are hinged the cylinder 17 of two double-acting hydraulic jacks 18. Each one of the these jacks comprises, in a manner well known in the art, a piston integral with a piston rod 20; each piston rod is terminated by an anchoring head 21. In FIG. 1 the jacks are represented in their retracted position; however, the rod of one of these jacks is also shown in the extended position (cf. the dotted lines in FIG. 1).

Figure 5:
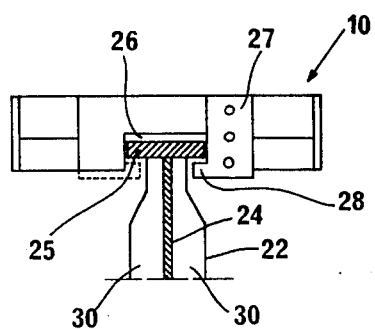
FIG. 5 is a partial view in transverse section of the platform shown in FIG. 1, and of the upper portion of the associated guiding rail.

Platform 10 normally rests on a guiding rail or beam 22 which, in the present embodiment, is constituted by an I-shaped section or beam the web 24 of which is arranged in a vertical plane, whereby the platform 10 engages the upper flange 25 through the intermediary of a supporting element 26 (cf. FIG. 5). Elements 27 are attached to platform 10 and provided with fingers 28 engaging the lower surface of flange 25 of the I-shaped section for guiding the platform on rail 22 and for preventing the platform from being raised with respect to the rail. Thus platform 10 is enabled to slide freely on rail 22. The latter is reinforced by substantially equally spaced gusset-plates 30 attached to web 24 and extending between said web and the flanges of the I-shaped section.

According to another important feature of the invention, platform 10 is provided with vertically movable catching elements or hooks 32. Each one of these hooks has the general configuration of a straight prism with a rectangular base; the upper end of the prism is provided with a plate 33 protruding beyond the periphery of said prism; the plate 33 of each hook bears a handle 35. Each hook 32 is provided, at one of its sides 37 with an oblique surface 36 connected by a rounded surface portion 38 to the base of the hook, while the side of the hook which is opposed to the above mentioned side 37 has a slot 40 the purpose of which will be described in detail herein below. Each hook 32 is mounted in a recess or shaft 42 provided in the associated box section 12 of the platform and extending entirely through said box section.

When the lower end of the box section is desengaged, hook 32 will move into its lowermost position wherein its plate 33 engages the periphery of the orifice of shaft 42; the length of hook 32 is such that its lower end portion projects from the shaft (cf. FIG. 2), beyond the lower face of the supporting element 26 which delimits the lower surface of the associated box section 12. Oblique surface 36 is so orientated that it is directed toward the front end of the platform, i.e. toward the jacks 17; said oblique surface 36 extends up to a location which, in the lowermost position of the hook, lies slightly above the supporting element 26.

The hooks 32 are arranged in pairs; three pairs of hooks are provided in the embodiment described and shown. The hooks of each pair are arranged symmetrically on the two mutually opposed sides of wall 13 of the platform, and the successive pairs are arranged in transverse planes equally spaced from each other, the distance L between any two adjacent pairs being smaller than the stroke length of the pistons of jacks 17. The guiding section, and more particularly flange 25 thereof, is provided with a plurality of apertures 43 arranged in pairs; the two apertures of each pair are symmetrical with respect to the web 24 of the I section, and any two successive pairs are separated by a distance equal to the above defined distance L. The section area of each aperture is slightly greater than the cross-sectional area of each hook 32.

Figure 2:
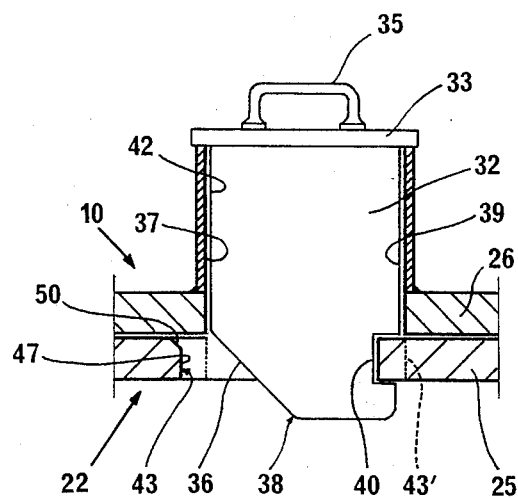
FIGS. 2 and 3 show, at a larger scale, the details of a hook associated with the platform shown in FIG. 1, this hook being shown respectively in the locking position and in a position wherein it is partially retracted from the associated guiding rail.
Figure 3:
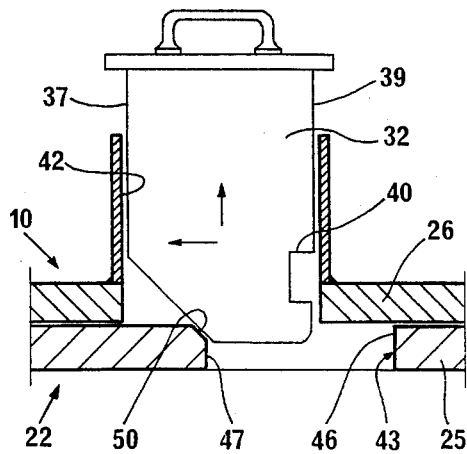

When platform 10 is placed on I-shaped section 22 in such a manner that shafts 42 receiving hooks 32 are in register with apertures 43 (which position is indicated by dotted lines at 43' in FIG. 2), each hook 32 freely moves downwardly within the associated shaft 42. The slot 40 of each hook is so arranged that it is then in alignment with the rear edge 46 of the corresponding aperture 42; it should be noted that the height of the slot is slightly greater than the thickness of flange 25. Thus when the platform 10 and its hooks 32 are moved in a rearward direction, the rear edge of each aperture penetrates the slot of the corresponding hook, thereby locking the platform which, in this position, can neither move forwardly, nor move rearwardly, nor be raised, as plate 33 engages the upper edge of the shaft; this position is shown in FIG. 2.

When, on the contrary, platform 10 is displaced on its rail in the forward direction, the oblique surface of each hook 32 forms a sliding ramp and engages the front edge 47 of the corresponding aperture 42, thus causing the hook to be raised under the effect of the oblique surface sliding on said front edge. A bevelled surface portion 50 is provided at the upper end of said front edge 47 with a view to enhancing this sliding effect.

The raising motion of hook 32 (in fact the simultaneous raising motions of all the hooks of the platform assembly) is continued until, after the rounded portion 38 has moved past the bevelled surface portion 50, the lower end of the hook, which latter is now in its raised position, rests on supporting element 26. There is consequently no longer any obstacle impeding the sliding motion in the forward direction of the platform. When platform 10 has been displaced over the distance L, shafts 42 are in register with the following apertures 43, and the hooks 32 will fall downwardly so as to penetrate said aperture 43.

The previously described conditions now prevail again:

Any displacement in a rearward direction will be limited to the depth of slot 40; on the contrary, another forwardly directed displacement can be effected again, while hooks 32 are raised as described herein before.

Figure 4:
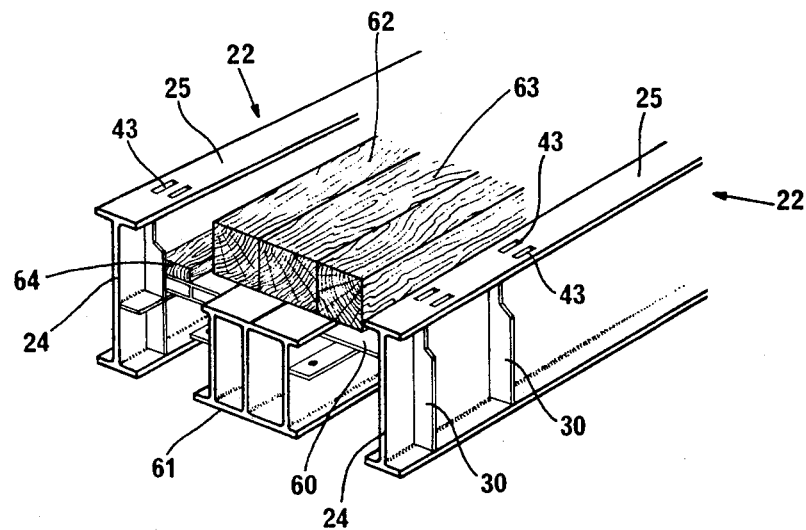
FIG. 4 is a partial perspective view of a sliding track for a load to be displaced, the track being arranged between two guiding rails.

The device according the invention is adapted to be used in combination with sliding tracks the mechanical properties and the dimensions of which are, of course, selected in accordance with the data of the loads to be displaced. FIG. 4 illustrates an example of a sliding track of this kind. This track comprises two guiding beams 24 or rails 22 having apertures 43 in their upper flanges 25 and provided with braces 60 which are distributed over the length of beams 24 with a convenient mutual spacing, box sections 61 are arranged between braces 60. Planks 62 are placed on box sections 61 and constitute the sliding track proper, on which rests the load to be displaced; the upper surface 63 of the planks 62 is located in a plane underneath the plane defined by the upper surfaces of flanges 25. Other planks 64 disposed laterally between beams 22 and planks 62 are provided for limiting the lateral displacement of the latter.

Each beam 22 is adapted to receive a platform 10; the piston rods of the actuating jacks are connected to a buffer 70 which is fixedly connected to the load 73 to be displaced. Load 73 is supported by a cradle 72 which rests on sliding track 62. The connection of the piston rods of the jacks to the load may be effected by any convenient means, e.g. by means of chains 74 (FIG. 6).

An actuating group 75 producing the hydraulic energy for the jacks is arranged behind platform 10 and connected to the latter. The hydraulic jacks are connected to group 75 by means of flexible tubes 76.

The above described installation operates as follows:

Hooks 32 are engaged in the apertures 43 of the rails and the jacks being in the retracted condition, said jacks are actuated to be extended. The platforms are then locked on the rails by the effect of the mutual engagement of slots 40 and the rear edges of apertures 43, and, the platform thus being prevented from being-/displaced in the rearward direction, the extension motion of the jacks causes the load 73 to be displaced in the forward direction over a distance substantially equal to L. The jacks are then retracted; as the piston rods of said jacks are connected to the load (the weight of which is substantially greater than that of the sum of the weights of the platforms, their accessories and the actuating group 75), the entire assembly will then move forwardly; this forward motion is by no means impeded by the hooks 32 which are raised and slide along the rails 25. After having effected a displacement over a distance slightly longer than L, hooks 32 will fall into the following shafts; the retracting motion of the jacks is then discontinued, and their motion is inverted.

During a first, very short phase, the entire platform assembly will effect a slight backward motion until the bottom of each slot 40 engages the rear edge of the corresponding aperture 43, whereby the above described initial position is reached again.

Thus it will be understood that by successively extending and retracting the jacks, the load is progressively displaced until it is entirely shifted e.g. unto a barge 77 (FIG. 6) or unto any other unloading or receiving station.

A plurality of sliding tracks of the kind shown in FIG. 4 may be arranged parallely with respect to each other when such an arrangement is required an account of the size and/or the weight of the load to be displaced. This case is illustrated by way of example of FIGS. 7 and 8.

It will be noted that in this embodiment two platforms 10 are integral with a shield member 80 which supports two jacks 17 the piston rods of which are connected to a buffer 70 engaging the load 82 to be displaced. Assemblies of this kind (only one of which is shown in the Figures) are used for displacing loads, while the extending and retracting motions of the jacks are, of course, synchronized.

It is to be understood that the invention is by no means limited to the embodiments shown and described herein above; various modifications may indeed be made thereof, e.g. as regards the number of hooks and their arrangement etc., while yet remaining within the scope of the instant invention, as defined by the appended claims.

What is claimed is:

1. A device for shifting a heavy load by slidingly displacing the same along a sliding track, comprising at least one movable platform provided with double acting hydraulic jacks the respective piston rods of which are connected to said load, said platform resting, through the intermediary of a supporting element, on a guiding rail associated to said track, locking means for locking said platform on said rail, said locking means comprising at least one catching element, mounted in a vertical shaft provided in said platform, so as to be vertically movable in said shaft between a lower position wherein a portion of said catching element projects from the lower surface of said supporting element, and a raised position wherein said catching element does substantially not project from said lower surface of said supporting element, said catching element having a general configuration of a prism with a rectangular base and being provided at its upper end with an integral plate the periphery of which protrudes over the periphery of said prism, and which is provided with a handle, said rail being provided with a plurality of regularly spaced rail apertures distributed over the length of said rail and adapted to receive said projecting portion of said catching element when the latter is in said lowered position, said projecting portion being provided at its front end, with reference to the direction of displacement of said load, with an oblique surface forming a sliding ramp adapted to cooperate with the front edge of any one of said rail apertures, and said projecting portion further being provided at its rear end with a locking surface adapted to cooperate with the rear edge of any one said rail apertures.

2. The device of claim 1, wherein said locking surface is formed substantially by the bottom wall of a slot provided at the rear end of said projecting portion of said catching element.

3. The device is claim 1, wherein the front edge of each one of said rail apertures is provided at its upper portion with a bevelled surface portion adapted to cooperate with said oblique surface of said catching element.

4. The device of claim 1, wherein said catching element is movably mounted in a vertical shaft provided in said platform.

5. The device is claim 1, wherein the distance between any two adjacent rail apertures is less than the stroke length of said jacks.

* * * * *

UNITED STATES PATENT OFFICE
CERTIFICATE OF CORRECTION

Patent No. 4,030,699  Dated June 21, 1977

Inventor(s) Wolfram Heimke

It is certified that error appears in the above-identified patent and that said Letters Patent are hereby corrected as shown below:

Column 1, line 18: Delete "the" (second occurrence).

Column 3, line 67: Change "tion" to --tional--.

Column 5, line 42: Change "of FIGS." to --in FIGS.--.

Column 6, line 1: Change "thereof" to --thereto--.

Column 6, line 16: Change "lower" to --lowered--.

Column 6, line 42: Change "is" to --of--.

Column 6, line 50: Change "is" to --of--.

Signed and Sealed this

Second Day of May 1978

[SEAL]

Attest:

RUTH C. MASON
Attesting Officer

LUTRELLE F. PARKER
Acting Commissioner of Patents and Trademarks